Patented Apr. 17, 1951

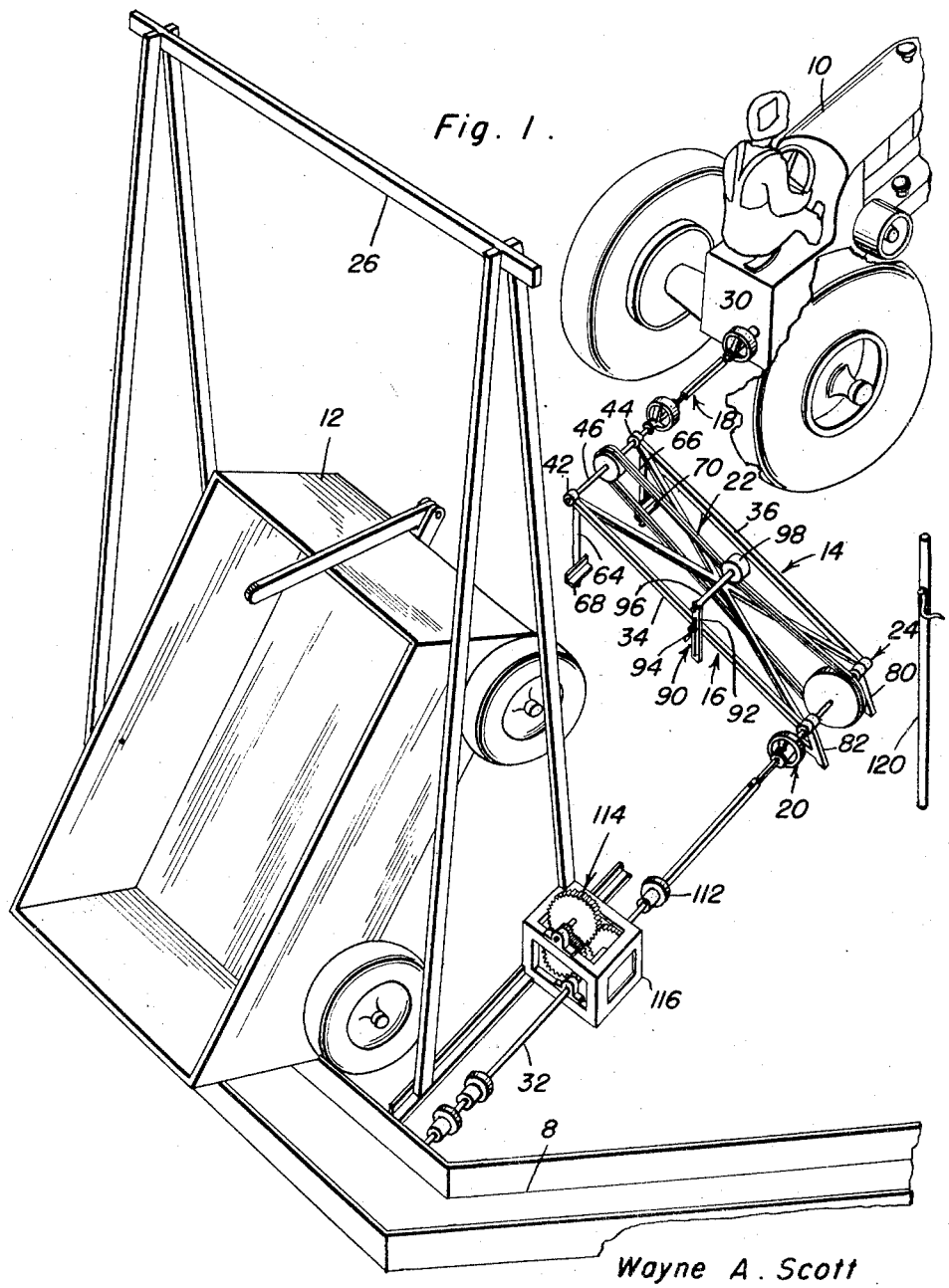

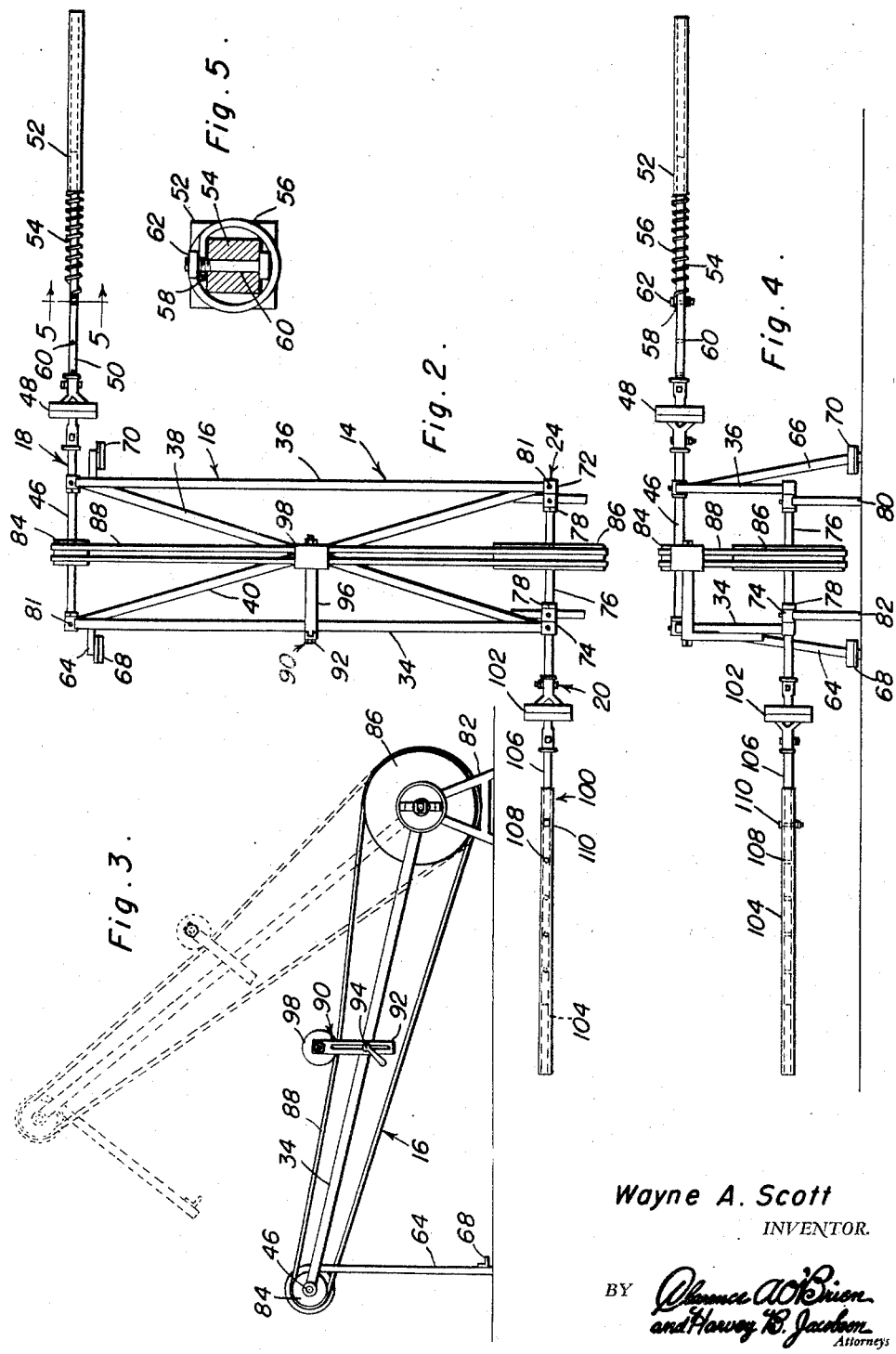

2,549,247

UNITED STATES PATENT OFFICE 2,549,247

DRIVE TRANSMITTING DEVICE

Wayne A. Scott, Saunemin, Ill.

Application May 7, 1948, Serial No. 25,671

4 Claims. (Cl. 74—15.6)

This invention relates to a drive transmitting device and has for its primary object to enable a driven device, such as an endless conveyor or elevator, to be easily and conveniently driven by the power take-off unit of a powered vehicle.

Another important object of this invention is to provide a drive transmitting device which, in association with a power take-off unit of a conventional tractor and a driven device, such as an elevator or conveyor, will be adaptable for convenient drive transmitting use, so that a drive connection between the power take-off unit and the driven device may be conveniently and easily effected, with a minimum expenditure of labor and with a considerable saving of time.

A meritorious feature of this invention resides in the provision of a pivotally mounted drive transmitting frame, having oppositely disposed shafts, which are adaptable for connection to the power take-off shaft or unit of a tractor and to a driven shaft for a driven device.

Another meritorious feature of this invention resides in the provision of adjustable shafts carried by the frame, the shafts being adjustable to describe various lengths so that the distance between the tractor and the driven device may be easily compensated for and adjusted, as desired.

These and ancillary objects and other meritorious features are attained by this invention, the preferred embodiment of which is set forth in the following description and illustrated in the accompanying drawings, wherein:

Figure 1 is a view in perspective of this invention showing the same in operative attachment with a power take-off unit of a conventional tractor and a conveyor, for a dump wagon;

Figure 2 is a top plan view of this invention;

Figure 3 is a side elevational view of this invention, showing the same in phantom lines, as it is moved about its pull away pivot point;

Figure 4 is an end elevational view of this invention; and

Figure 5 is a vertical sectional view taken substantially on the transverse plane of line 5—5 of Figure 2, illustrating the means provided for adjusting one of the shafts.

This invention relates generally to a drive transmitting device, which is adaptable for use in various fields of agriculture and industry, where means is needed for transmitting a driving power from a drive device to a driven attachment or device. Especially is this true in the field of agriculture, where various and sundry implements and devices are operatively associated with a powered unit, having a power take-off unit. It is well known that a conventional tractor having a customary power take-off shaft or unit is employed to drive various drafted implements and attachments. It is with particular reference to this field that the meritorious utility of this invention will be apparent.

With reference to Figure 1 of the drawings, it is to be noted that a conventional tractor or powered vehicle is employed to draft a dumping wagon 12. It is the customary practice for persons engaged in agricultural pursuits to draft or convey products or crops in a draft wagon, through the medium of a tractor. The conveyed articles, such as corn or the like products, are hauled to a sorting or discharging conveyor or elevator 8, which conveys the articles to a barn or other storage point. At the present time, the elevator or conveyor is individually driven, through the medium of a separate and individual prime mover. However, it has been found advantageous to employ the power take-off shaft or unit of the powered vehicle to drive the elevator or conveyor. The conventional means employed entails a considerable outlay of time and labor, necessitating various positions of the tractor in close proximity to the conveyor and, also, the necessity of attaching and detaching drive transmitting systems between the driving and driven units.

To obviate these and other defects and to save considerable time and labor, all important in the field of agriculture, is the primary purpose of this invention. It is to be noted, with reference to Figure 1 of the drawings, that this invention, generally denoted by the character reference 14, generally comprises a frame assembly 16, having a driving shaft assembly 18 and a driven shaft assembly 20. Drive transmitting means 22 is disposed within the frame and communicates the driving assembly 18 with the driven assembly 20. The frame 16 is adapted for foldaway movement on a horizontal axis or pivot point 24.

Thus, the wagon 12, attached to the drawbar of the tractor 10, is backed into dumping placement with relation to the elevator or conveyor 8. The wagon is hoisted on the frame 26, through suitable conventional means, and maintained in a hoisted or dumping placement. The tractor 10 is then driven forwardly from the supporting frame 26, and the frame 16 is moved downwardly about its pivot point 24 so that the driving shaft assembly 18 is in longitudinal alignment with the power take-off unit 30, projecting rearwardly from the tractor. The driving shaft assembly is easily connected to the power take-off unit and the shaft 32 of the driven elevator or conveyor is rotated, through the medium of this invention 14. After the articles are conveyed by the elevator, the driving shaft assembly is disconnected from the take-off unit 30 and the frame 16 is moved upwardly around its foldaway pivot point 24 to a vertical placement. A locking post, having suitable latch means disposed thereon, is provided to maintain the frame in a raised, inoperative position. Then, the tractor is backed into hitch engagement with the wagon and the wagon is transported back to the produce pickup locale.

Referring now more particularly to the drawings, the frame 16 comprises a pair of parallel bars 34 and 36. A pair of rigidifying or bracing bars 38 and 40 are welded or otherwise secured to the inner surfaces of the parallel frame bars, adjacent the opposite ends thereof, and are medially crossed. A pair of bushings or bearings 42 and 44 are suitably secured on one end of the parallel frame bars and are adapted to rotatably support a shaft 46, which extends transversely therethrough, having one end projected laterally or forwardly of the frame. A knuckle 48 is secured to the extended end of the shaft and supports a telescopic shafting 50, which comprises a pair of telescopic shafts 52 and 54. The shafts 52 and 54 are preferably square in cross section and are adjustable with respect to each other. Resilient means 56 is received on the shaft 54 and has one end welded to the slidably disposed outer shaft 52. The opposite end of the resilient means or compression spring 56 terminates in an eyelet or hook 58. A plurality of spaced transverse adjusting apertures 60 are disposed in the shaft 54 and, in association with suitable securing means such as a bolt assembly 62 which engages the eyelet 58, enable the shafts 52 and 54 to define various lengths.

Leg bars or vertical supporting legs 64 and 66 depend from the lower or bottom surface of the support bars 34 and 36 and have transverse stop plates 68 and 70 secured adjacent the depending ends thereof. The stop plates limit the ground penetration of the supporting legs.

The opposite ends of the parallel bars 34 and 36 terminate in bearing bushings 72 and 74, which rotatably support a shaft 76, having one end projecting rearwardly from the frame, in an opposed direction from the shaft 46. Of course, collars 78 are provided, as is customary. Also, zerk fittings 81 are disposed vertically in the bearing bushings to lubricate the shaft 76 and reduce the friction between the shaft and the bearings. Secured to the under surface of the bearings 72 and 74 are triangular standards 80 and 82, which are substantially lower than the front supporting legs 64 and 66.

A pulley 84 is keyed on the medial portion of the shaft 46 and a similar pulley 86 is keyed on the center portion of the shaft 76, between the collars 78 in alignment therewith. Belts 88 are communicated between the pulleys. Suitable means is provided for tightening the belts 88 and may comprise a belt tightener 90. The belt tightener 90 comprises a vertically disposed arm 92, having an elongated adjusting slot disposed therein. Securing means 94, such as a wing bolt or the like, projects from the parallel bar 34 and is received within the guideway or slot formed in the arm. A shaft 96 extends laterally from the upper end of the arm and carries an idler pulley 98, which is adapted to engage and bear against the rear surface of the belts.

The shaft 76 is suitably connected to a driven shafting 100, through the medium of a knuckle 102. The driven shafting 100 comprises a pair of telescopic shafts 104 and 106. Suitable means is provided for adjusting the various lengths of the shafting 100 and comprises a series of transverse adjusting apertures 108 disposed in the complementary shafts. Suitable means is provided for engaging the aligned openings or apertures and may comprise a bolt assembly 110, which is adapted to serve as securing means for maintaining the shafts in the desired position. The shafts 104 and 106 are preferably hollow and square in cross section. The end of the shaft 104, which is slidably disposed on the shaft 106, is secured, through the medium of a conventional slip clutch 112, to a driven shaft 32 of the driven device 14. The provision of the disk-type slip clutch enables a true and positive drive to be maintained and, at the same time, enables the drive transmitting means 14 to be inoperative with respect to the driven shaft 32, in the event a material clog or the like should occur, adjacent the conveyor or elevator.

If desired, a gear train 114, enclosed in a gear box 116, may be employed to raise and lower the wagon or drafted vehicle 12. Also, the gear train may be utilized as a gear reduction unit to regulate the speed of the elevator or conveyor.

Of course, a vertical post or stake 120 may be positioned in the ground, adjacent to the standards 80 or 82, and may be provided with suitable latch means so that the frame 16, when moved about its pivot point 24, will be held in a vertical, inoperative position.

Thus, in view of the description and the accompanying drawings, it is believed that the utility and novelty of this invention will become apparent to those skilled in the art and, accordingly, a more detailed description is not believed necessary.

However, since many other purposes and objects of this invention will become apparent, upon a perusal of the foregoing description, in view of the accompanying drawings, it is to be understood that certain changes may be effected thereon as coming within the spirit of the invention and the scope of the appended claims.

Having described the invention, what is claimed as new is:

1. In combination with a power take-off unit of a power vehicle and a driven device, means for transmitting power from the take-off unit to the driven device comprising an open frame having a first and second end, a drive shaft rotatably journaled in the first end and extending laterally therefrom, a driven shaft rotatably journaled in the second end and projecting laterally therefrom in an opposite direction from the drive shaft, pulleys fixed on the medial portions of the shafts, means connecting said pulleys, bearing members on the second end of the frame, said bearing members being rotatably disposed on the journaled end of the driven shaft, whereby the first end of the frame can be moved into and out of axial alignment with the power take-off unit.

2. In combination with a power take-off unit of a power vehicle and a driven device, means for transmitting power from the take-off unit to the driven device comprising an open frame having a first and second end, a drive shaft rotatably journaled in the first end and extending laterally therefrom, a driven shaft rotatably journaled in the second end and projecting laterally therefrom in an opposite direction from the drive shaft, pulleys fixed on the medial portions of the shafts, means connecting said pulleys, bearing members on the second end of the frame, said bearing members being rotatably disposed on the journaled end of the driven shaft, whereby the first end of the frame can be moved into and out of axial alignment with the power take-off unit, and means for supporting the frame in a raised position.

3. In combination with a power take-off unit of a power vehicle and a driven device, means for transmitting power from the take-off unit to the driven device and including a pair of parallel bars, a drive shaft rotatably journaled to one of the ends of the bars and extending laterally therefrom for attachment to the power take-off unit, supporting means suspended from said ends, a driven shaft, bearing collars at the opposing ends of the bars journaled on the driven shaft, said driven shaft extending laterally from the collars and projecting in an opposite direction from the drive shaft, and drive transmitting means connected between said shafts.

4. In combination with a power take-off unit of a power vehicle and a driven device, means for transmitting power from the take-off unit to the driven device and including a pair of parallel bars, a drive shaft rotatably journaled to one of the ends of the bars and extending laterally therefrom for attachment to the power take-off unit, supporting means suspended from said ends, a driven shaft, bearing collars at the opposing ends of the bars journaled on the driven shaft, said driven shaft extending laterally from the collars and projecting in an opposite direction from the drive shaft, and drive transmitting means connected between said shafts, and means adapted to be connected to the frame for sustaining the frame in a vertical position out of interposition between the power vehicle and driven device.

WAYNE A. SCOTT.

REFERENCES CITED

The following references are of record in the file of this patent:

UNITED STATES PATENTS

| Number | Name | Date |
|---|---|---|
| 389,467 | Harrison | Sept. 11, 1888 |
| 481,988 | Weyburn | Sept. 6, 1892 |
| 987,178 | Schutte | Mar. 21, 1911 |
| 1,332,558 | Koetker | Mar. 2, 1920 |
| 1,496,999 | Ray | June 10, 1924 |
| 1,658,344 | Kurtz | Feb. 7, 1928 |
| 2,097,703 | Ronning | Nov. 2, 1937 |
| 2,340,983 | Pfeiffer et al. | Feb. 8, 1944 |